(12) United States Patent
Endo et al.

(10) Patent No.: US 8,676,433 B2
(45) Date of Patent: Mar. 18, 2014

(54) CONTROL DEVICE FOR VEHICLE HYDRAULIC CONTROL CIRCUIT

(75) Inventors: Hiroatsu Endo, Nagoya (JP); Masatoshi Ito, Okazaki (JP)

(73) Assignee: Toyota Jidosha Kabushiki Kaisha, Aichi (JP)

( * ) Notice: Subject to any disclaimer, the term of this patent is extended or adjusted under 35 U.S.C. 154(b) by 230 days.

(21) Appl. No.: 13/144,020

(22) PCT Filed: Jan. 9, 2009

(86) PCT No.: PCT/JP2009/050258
§ 371 (c)(1),
(2), (4) Date: Jul. 11, 2011

(87) PCT Pub. No.: WO2010/079622
PCT Pub. Date: Jul. 15, 2010

(65) Prior Publication Data
US 2011/0270483 A1   Nov. 3, 2011

(51) Int. Cl.
*F16H 61/12*    (2010.01)
*F04B 23/08*    (2006.01)

(52) U.S. Cl.
USPC .............. 701/29.1; 701/29.7; 701/62; 477/97

(58) Field of Classification Search
USPC ........ 701/29.1, 29.7, 64, 62, 31.6, 31.8, 34.4; 477/97, 906; 475/127
See application file for complete search history.

(56) References Cited

U.S. PATENT DOCUMENTS

| 5,971,889 | A | 10/1999 | Ohashi et al. |
| 6,907,970 | B2* | 6/2005 | Sugimura ..................... 188/382 |
| 8,136,616 | B2* | 3/2012 | Padilla et al. .............. 180/65.28 |
| 2007/0049457 | A1* | 3/2007 | Sato et al. ........................ 477/97 |
| 2007/0225101 | A1* | 9/2007 | Takagi .......................... 475/116 |
| 2008/0113839 | A1* | 5/2008 | Nozaki et al. ................... 475/31 |

FOREIGN PATENT DOCUMENTS

| JP | 03-070860 A | 3/1991 |
| JP | 11-082724 A | 3/1999 |
| JP | 2005-195042 A | 7/2005 |
| JP | 2007-016933 A | 1/2007 |
| JP | 2007-046621 A | 2/2007 |
| JP | 2007-057057 A | 3/2007 |
| JP | 2008-261430 A | 10/2008 |

* cited by examiner

Primary Examiner — Tan Q Nguyen
(74) Attorney, Agent, or Firm — Sughrue Mion, PLLC

(57) ABSTRACT

A control device for a vehicle hydraulic control circuit having a hydraulic switch disposed on a hydraulic control circuit of an automatic transmission, includes: a malfunction detecting portion configured to detect a malfunction of the hydraulic switch; and a malfunction removing portion configured to execute an operation for restoring a contact of the hydraulic switch when a malfunction of the hydraulic switch is detected.

10 Claims, 10 Drawing Sheets

|  | SL1 | SL2 | B1 | B2 |
|---|---|---|---|---|
| LOW-SPEED STAGE L (FIRST SPEED) | × | ○ | × | ○ |
| HIGH-SPEED STAGE H (SECOND SPEED) | ○ | × | ○ | × |

WHITE CIRCLE INDICATES THAT HYDRAULIC OUTPUT EXISTS
CROSS MARK INDICATES THAT NO HYDRAULIC OUTPUT EXISTS

US 8,676,433 B2

CONTROL DEVICE FOR VEHICLE HYDRAULIC CONTROL CIRCUIT

CROSS REFERENCE TO RELATED APPLICATIONS

This application is a National Stage of International Application No. PCT/JP2009/050258 filed Jan. 9, 2009, the contents of all of which are incorporated herein by reference in their entirety.

TECHNICAL FIELD

The present invention relates to a control device for a vehicle hydraulic control circuit, and, more particularly, to reliability improvement of malfunction detection of a hydraulic control circuit.

BACKGROUND ART

A control device for a vehicle hydraulic control circuit is well known that includes an automatic transmission having a shift transmission state hydraulically switched, a hydraulic control circuit that controls oil pressure supplied to the automatic transmission, and a hydraulic switch disposed on the hydraulic control circuit to detect an oil pressure supply state. One example is a power output device of Patent Document 1, for example. Patent Document 1 discloses a technique of determining a malfunction of a hydraulic control circuit based on a state of a hydraulic switch turned on/off based on a degree of oil pressure acting thereon to execute a control routine (fail-safe) at the time of malfunction if a malfunction is detected.

Patent Document 1: Japanese Laid-Open Patent Publication No. 2007-16933

DISCLOSURE OF THE INVENTION

Problem to be Solved by the Invention

If a malfunction is detected based on the hydraulic switch, a fail-safe corresponding to the malfunction is executed; however, even if a temporal malfunction occurs in the hydraulic switch, a fail-safe may be executed and traveling performance may be limited. For example, if an oxide or a foreign material in operating oil attaches to a contact of the hydraulic switch, i.e., if so-called contact corrosion occurs, the hydraulic switch may return to a normal state when the contact corrosion is removed by a change in oil pressure etc. Even in such a case, a fail-safe may be executed because the hydraulic switch is determined as malfunctioning due to the contact corrosion.

The present invention was conceived in view of the situations and it is therefore an object of the present invention to provide a control device for a vehicle hydraulic control circuit capable of improving reliability of a hydraulic switch in a vehicle hydraulic control circuit including a hydraulic switch.

Solution to Problem

The object indicated above can be achieved according to the present invention, which provides a control device for a vehicle hydraulic control circuit having a hydraulic switch disposed on a hydraulic control circuit of an automatic transmission, including: a malfunction detecting means that detects a malfunction of the hydraulic switch; and a malfunction removing means that executes an operation for restoring a contact of the hydraulic switch when a malfunction of the hydraulic switch is detected.

Advantageous Effects of Invention

As a result, for example, if a malfunction having a possibility of restoration occurs such as contact corrosion of the hydraulic switch, a malfunction of the hydraulic switch is detected; however, the malfunction removing means can be implemented in this case to remove the contact corrosion. Therefore, the reliability of the hydraulic switch in the malfunction detection can be improved by performing the malfunction detection again while the contact corrosion is removed.

Preferably, the malfunction removing means intermittently changes an oil pressure applied to the hydraulic switch to repeat ON/OFF operations of the contact of the hydraulic switch. As a result, an oxide or a foreign material attached to the contact of the hydraulic switch SW can be removed.

Preferably, the malfunction removing means increases an electric current applied to the hydraulic switch. As a result, an oxide or a foreign material attached to the contact of the hydraulic switch SW can be electrically removed.

Preferably, the malfunction removing means is implemented at the time of system activation of a vehicle. As a result, a malfunction of the hydraulic switch can be detected in the state not affecting the travel of the vehicle.

Preferably, the malfunction removing means is implemented after completion of shift of the automatic transmission. As a result, since the traveling state is not affected by, for example, changing the oil pressure after completion of the shift, a malfunction of the hydraulic switch can be detected in the state not affecting the travel of the vehicle.

Preferably, the control device includes an actual malfunction confirming means that confirms that the hydraulic switch has an actual malfunction if a malfunction of the hydraulic switch continues despite the operation of the malfunction removing means, and a hydraulic switch usage prohibiting means that prohibits use of the hydraulic switch confirmed as having an actual malfunction by the actual malfunction confirming means. As a result, travelling abnormality associated with a malfunction of the hydraulic switch can be avoided.

REFERENCE SIGNS LIST

Figure 1:
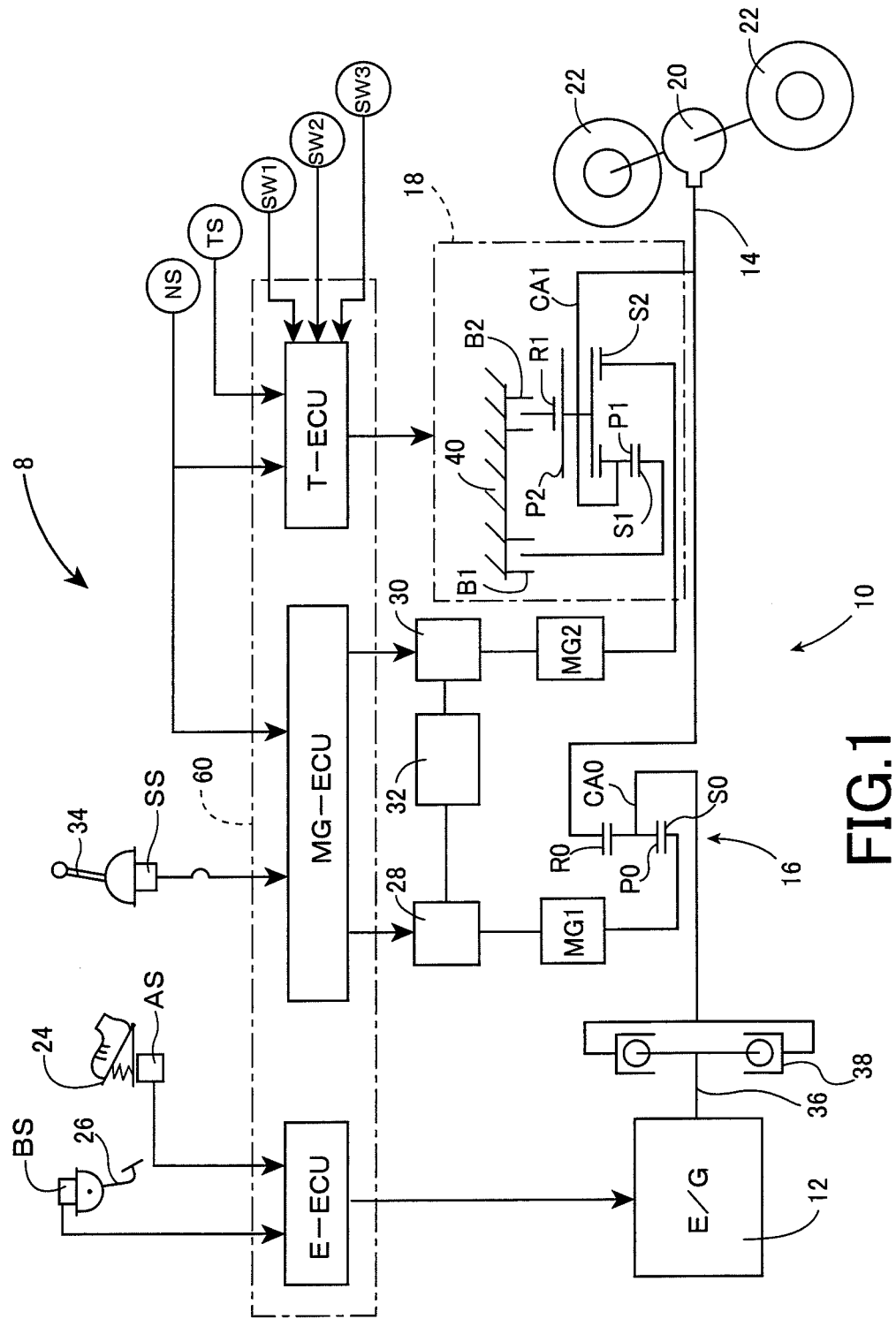
FIG. 1 is a diagram for explaining a hybrid vehicle 8 to which the present invention is preferably applied.

8: hybrid vehicle 10: power transmission device 12: engine 14: output shaft 16: power distribution mechanism 18: automatic transmission 20: differential gear device 22: drive wheels 26: brake pedal 28: inverter 30: inverter 32: electric storage device 34: shift lever 36: crankshaft 38: damper 40: housing 50: hydraulic control circuit 60: electronic control device 70: mechanical oil pump 72: electric oil pump 74: primary regulator valve 76: modulator valve 78: hydraulic actuator 80: first fail-safe valve 82: hydraulic actuator 84: second fail-safe valve 100: input port 102: output port 104: input port 106: output port 108: spring 110: input port 112: output port 114: input port 116: output port 118: spring 130: hybrid drive control means 132: shift control means 134: malfunction detecting means 136: system activation request determining means 138: shift completion determining means 140: malfunction removing means 142: actual malfunction confirming means 146: hydraulic switch usage prohibiting means 160: power transmission device 162: torque converter 164: automatic transmission 166: first planetary gear device 168: first shifting portion 170: second planetary gear device 172: third planetary gear device 174: second shifting portion 176: input shaft 178: output gear 180: case 202: shift operation device 204: shift lever 206: P-switch 208: shift operation detection device 210: electronic control unit 212: SWB actuator 214: switching shaft 216: lever 218: shift switching valve 220: spool 222: hydraulic control circuit 224: B2 control valve 226: supply oil passage 228: forward oil passage 230: backward oil passage 232: noncontact position sensor SW1 to SW5: hydraulic switches

BEST MODES FOR CARRYING OUT THE INVENTION

Embodiments of the present invention will now be described in detail with reference to the drawings. In the following embodiments, the figures are simplified or modified as needed and dimensional ratios and shapes of portions are not necessarily correctly depicted.

Embodiments

FIG. 1 is a diagram for explaining a hybrid vehicle 8 to which the present invention is preferably applied. The hybrid vehicle 8 depicted in FIG. 1 includes a power distribution mechanism 16 that distributes power output from an engine 12 as a main power source to a first electric motor MG1 and an output shaft 14 as a transmitting member, and a vehicle power transmission device (hereinafter, power transmission device) 10 that has a second electric motor MG2 operatively coupled to the output shaft 14 via an automatic transmission 18 as a gear mechanism. With the power transmission device 10, which is preferably used with an FR (front-engine rear-drive) vehicle etc., torques output from the engine 12, the second electric motor MG2, etc., are transmitted to the output shaft 14 and a torque is transmitted from the output shaft 14 via a differential gear device 20 to a pair of left and right rear wheels (drive wheels) 22. Since the power transmission device 10 is configured symmetrically relative to the center line thereof, the lower half is not depicted in FIG. 1.

The power transmission device 10 increases or decreases the torque transmitted from the second electric motor MG2 to the output shaft 14 in accordance with a gear ratio γS (=rotation speed of MG2/rotation speed of the output shaft 14) set in the automatic transmission 18. The gear ratio γS of the automatic transmission 18 is configured to be set at a plurality of stages equal to or greater than "1" and, at the time of power running when an output torque $T_{MG2}$ is output from the second electric motor MG2, the MG2 torque $T_{MG2}$ can be increased and transmitted to the output shaft 14 and, therefore, the second electric motor MG2 can be configured with a lower capacity or a smaller size. As a result, if the rotation speed of the output shaft 14 is increased, for example, in association with a higher vehicle speed, the rotation speed of the second electric motor MG2 is reduced by lowering the gear ratio γS of the automatic transmission 18 so as to maintain the operation efficiency of the second electric motor MG2 in a favorable state. If the rotation speed of the output shaft 14 is reduced, the gear ratio γS of the automatic transmission 18 is increased as needed.

The engine 12 is a main power source of the hybrid vehicle 8 and is a known internal combustion engine that combusts a predetermined fuel to output power, for example, a gasoline engine or a diesel engine. The hybrid vehicle 8 includes an electronic control device 60 mainly made up of a microcomputer and the engine 12 is configured to have an operational state such as a throttle opening degree or an intake air amount, a fuel supple amount, and an ignition timing electrically controlled by an engine-control electronic control unit (E-ECU) included in the electronic control device 60. The engine-control electronic control unit (E-ECU) is supplied with detection signals from an accelerator opening degree sensor AS that detects an operation amount of an accelerator pedal 24, a brake sensor BS for detecting operation of a brake pedal 26, etc.

The first electric motor MG1 and the second electric motor MG2 are, for example, synchronous electric motors having at least one of functions as an electric motor (motor) that generates a drive torque and as an electric generator (generator) and are preferably motor generators capable of being selectively operated as an electric motor or an electric generator. The first electric motor MG1 and the second electric motor MG2 are connected via invertors 28, 30 to an electric storage device 32 such as a battery or a capacitor, and output torques or regenerative torques of the first electric motor MG1 and the second electric motor MG2 are adjusted or set by controlling the invertors 28, 30 with a motor-generator-control electronic control unit (MG-ECU) included in the electronic control device 60. The motor-generator-control electronic control unit (MG-ECU) is supplied with detection signals from an operation position sensor SS that detects an operation position of a shift lever 34, an output rotation speed sensor NS that detects a rotation speed of the output shaft 14 corresponding to a vehicle speed, etc.

The power distribution mechanism 16 is made up of a single pinion type planetary gear device that includes a sun gear S0, a ring gear R0 disposed concentrically to the sun gear S0, and a carrier CA0 that supports a pinion gear P0 engaging with the sun gear S0 and the ring gear R0 in a rotatable and revolvable manner as three rotating elements to generate a known differential action. This planetary gear device is disposed concentrically to the engine 12 and the automatic transmission 18. In the power transmission device 10, a crankshaft 36 of the engine 12 is coupled to the carrier CA0 of the power distribution mechanism 16 via a damper 38. On the other hand, the sun gear S0 is coupled to the first electric motor MG1, and the ring gear R0 is coupled to the output shaft 14. In the power distribution mechanism 16, the carrier CA0 functions as an input element; the sun gear S0 functions as a reaction force element; and a ring gear R0 functions as an output element.

Figure 2:
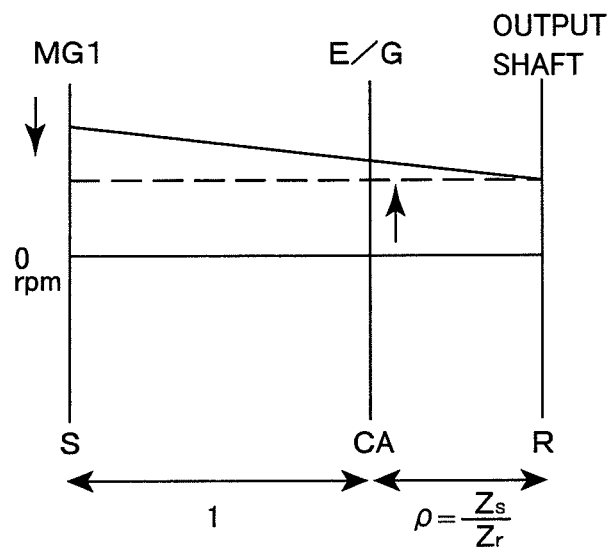
FIG. 2 is a collinear diagram for representing the relative relationship of the rotation speed of each of the rotating elements of the power distribution mechanism of FIG. 1.

A relative relationship among rotation speeds of the rotating elements in the power distribution mechanism 16 is represented by a collinear diagram of FIG. 2. In this collinear diagram, a vertical axis S, a vertical axis CA, and a vertical axis R are axes representative of a rotation speed of the sun gear S0, a rotation speed of the carrier CA0, and a rotation speed of the ring gear R0, respectively, and intervals between the vertical axis S, the vertical axis CA, and the vertical axis R are set such that an interval between the vertical axis CA and the vertical axis R is ρ (teeth number Zs of the sun gear S0/teeth number Zr of the ring gear R0) when an interval between the vertical axis S and the vertical axis CA is set to one. If a reaction torque from the first electric motor MG1 is input to the sun gear S0 for an output torque (engine torque) $T_E$ of the engine 12 input to the carrier CA0 in this power distribution mechanism 16, a torque greater than the torque input from the engine 12 occurs at the ring gear R0 that is the output element and, therefore, the first electric motor MG1 functions as an electric generator. As a result, in the power distribution mechanism 16, an electric stepless transmission is made up as an electric transmission mechanism coupled to the engine 12 in a power transmittable manner and having the first electric motor MG1 as a differential electric motor coupled in a power transmittable manner with a differential state controlled by controlling an operational state of the first electric motor MG1. Therefore, the power of the engine 12 is transmitted to the output shaft 14 via the power distribution mechanism 16 acting as the stepless transmission.

By controlling the differential state of the power distribution mechanism 16, when a rotation speed (output shaft rotation speed) $N_{OUT}$ of the ring gear R0 is constant, the rotation speed $N_E$ of the engine 12 can be changed continuously (without a step) by changing the rotation speed of the first electric motor MG1 higher or lower. A broken line of FIG. 2 indicates a state of the rotation speed (engine rotation speed) $N_E$ of the engine 12, which decreases when the rotation speed of the first electric motor MG1 is reduced from a value indicated by a solid line. When the power distribution mechanism 16 functions as a stepless transmission, the first electric motor MG1 can be controlled to perform the control for setup to a point of operation (operational point: determined by e.g., the engine rotation speed $N_E$ and the engine torque $T_E$) of the engine 12 that achieves the optimum fuel efficiency, for example.

Referring to FIG. 1 again, the automatic transmission 18 is made up of a set of Ravigneaux type planetary gear mechanisms. In other words, a first sun gear S1 and a second sun gear S2 are disposed; a short pinion P1 engages with the first sun gear S1; the short pinion P1 engages with a long pinion P2 having a longer shaft length than the short pinion P1; and the long pinion P2 engages with a ring gear R1 disposed concentrically to the sun gears S1, S2. The pinions P1, P2 are held by a common carrier CA1 in a rotatable and revolvable manner. The sun gear S2 engages with the long pinion P2. The second sun gear S2 is coupled to the second electric motor MG2 and the carrier CA1 is coupled to the output shaft 14. The first sun gear S1 and the ring gear R1 make up a mechanism corresponding to a double pinion type planetary gear device together with the pinions P1, P2, and the sun gear S2 and the ring gear R1 make up a single pinion type planetary gear device together with the long pinion P2.

The automatic transmission 18 is disposed with a first brake B1 disposed for selectively fixing the first sun gear S1 between the first sun gear S1 and a housing 40 that is a non-rotating member, and a second brake B2 disposed for selectively fixing the ring gear R1 between the ring gear R1 and the housing 40. The brakes B1, B2 are so-called friction engagement devices that generates a braking force using a frictional force and are preferably made up of wet multi-plate type hydraulic friction engagement devices having a hydraulic actuator pressing a plurality of friction plates overlapped with each other or of a band brake having a hydraulic actuator fastening one end of one or two bands wrapped around an outer peripheral surface of a rotating drum, for the purpose of selectively coupling members on the both sides of the devices interposed therebetween. Torque capacities of the brakes B1, B2 are continuously changed depending on an oil pressure (engagement pressure) of operating oil for operating the brakes B1, B2.

In the automatic transmission 18 configured as described above, the second sun gear S2 functions as an input element and the carrier CA1 functions as an output element and, when the first brake B1 is engaged, a high-speed stage "2nd" having a gear ratio γsh greater than "1" is established. When the second brake B2 is engaged instead of the first brake B1, a low-speed stage "1st" is set that has a gear ratio γsl greater than the gear ratio γsh of the high-speed stage "2nd". As described above, the automatic transmission 18 is a mechanical transmission mechanism that has gear stages switched by engaging and releasing the hydraulic friction engagement devices.

A shift between the gear stages "2nd" and "1st" is performed based on a traveling state such as a vehicle speed and a requested drive-power related value (target drive-power related value). More specifically, for example, empirically determined gear stage areas are stored as a map (shift line diagram) and the control is performed such that one of the gear stages is set depending on a detected operation state. The electronic control device 60 is disposed with a transmission-control electronic control unit (T-ECU) for performing the control. The transmission-control electronic control unit (T-ECU) is supplied with detection signals, etc., from an oil temperature sensor TS for detecting a temperature (operating oil temperature) $TH_{OIL}$ of the operation oil, a hydraulic switch SW1 for detecting an engagement oil pressure of the first brake B1, a hydraulic switch SW2 for detecting an engagement oil pressure of the second brake B2, a hydraulic switch SW3 for detecting a line oil pressure PL, an output rotation speed sensor NS, etc.

A drive-power related value of the requested drive-power related value corresponds one-to-one to a drive power of a vehicle and may correspond not only to a drive torque or a drive power at the drive wheels 22 but also to an output torque (output shaft torque) of the output shaft 14, an engine torque, or vehicle acceleration, for example. Although a requested drive-power related value is a requested value (target value) of a drive-power related value determined based on, for example, an accelerator opening degree (or a throttle valve opening degree, an intake air amount, an air-fuel ratio, a fuel injection amount), an accelerator opening degree, etc., may directly be used.

Figure 3:
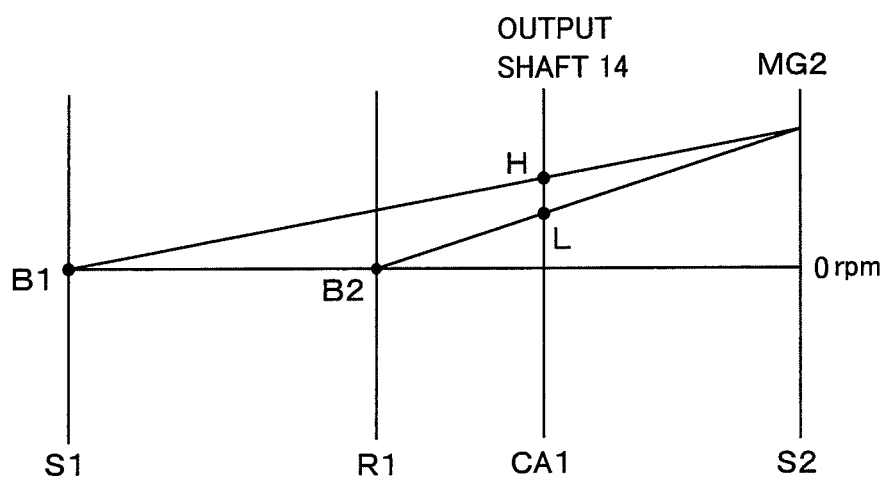
FIG. 3 is a collinear diagram for representing the relative relationship of the rotation speed of each of the rotating elements making up the automatic transmission of FIG. 1.

FIG. 3 is a collinear diagram having four vertical axes, which are a vertical axis S1, a vertical axis R1, a vertical axis CA1, and a vertical axis S2, for representing correlation of the rotating elements for the Ravigneaux type planetary gear mechanisms making up the automatic transmission 18. The vertical axis S1, the vertical axis. R1, the vertical axis CA1, and the vertical axis S2 represent a rotation speed of the first sun gear S1, a rotation speed of the ring gear R1, a rotation speed of the carrier CA1, and a rotation speed of the second sun gear S2, respectively. If the ring gear R1 is fixed by the second brake B2 in the automatic transmission 18, a low-speed stage "1st" is set and an assist torque output by the second electric motor MG2 is amplified in accordance with the gear ratio γsl at the time and added to the output shaft 14. If the sun gear S1 is fixed by the first brake B1 instead, a high-speed stage "2nd" is set that has a gear ratio γsh smaller than the gear ratio γsl of the low-speed stage "1st". Since the gear ratio at the high-speed stage "2nd" is greater than "1", an assist torque output by the second electric motor MG2 is increased in accordance with the gear ratio γsh and added to the output shaft 14. While each of the gear stages "1st", "2nd" is steadily set, the torque applied to the output shaft 14 is a torque acquired by increasing the output torque of the second electric motor MG2 in accordance with each of the gear ratios; however, in a shift transition state of the automatic transmission 18, the torque is affected by the torque capacities of the brakes B1, B2 and an inertia torque associated with a change in the number of rotations. The torque added to the output shaft 14 is a positive torque (drive torque) while the second electric motor MG2 is in the driving state and is a negative torque (brake torque) while the second electric motor MG2 is in the driven state. Therefore, while the second electric motor MG2 is in the driven state, a regenerative braking force is generated by regenerative operation.

Figures 4, 5:
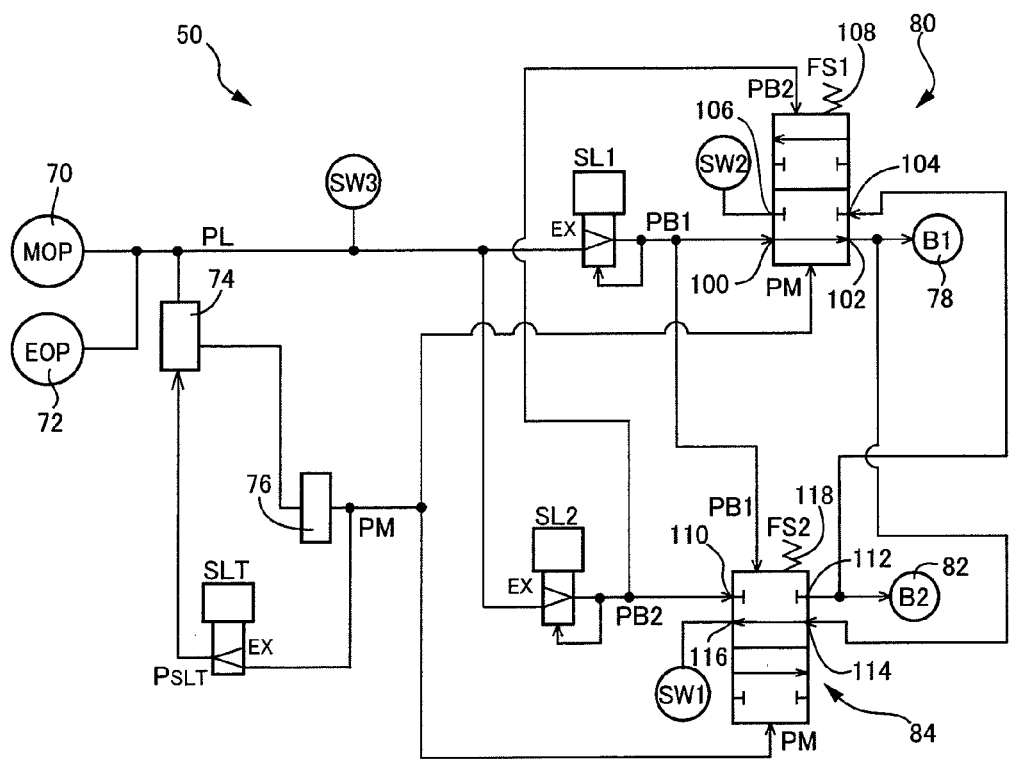
FIG. 4 is a chart for explaining operation of a hydraulic control circuit for switching the gear stages in the automatic transmission.
FIG. 5 is a configuration diagram of a general configuration of the hydraulic control circuit.

FIG. 4 is a chart for explaining operation of a hydraulic control circuit 50 (see FIG. 5) for switching the gear stages in the automatic transmission 18; a white circle indicates a hydraulic output state or an engaged state of a brake; and a cross mark indicates a hydraulic non-output state or a released state. As depicted in FIG. 4, when a linear solenoid valve SL1 (see FIG. 5) is put into the hydraulic non-output state and a linear solenoid valve SL2 (see FIG. 5) is put into the hydraulic output state, the first brake B1 is put into the released state and the second brake B2 is put into the engaged state to establish the low-speed stage "1st" of the automatic transmission 18. On the other hand, when the linear solenoid valve SL1 is put into the hydraulic output state and the linear solenoid valve SL2 is put into the hydraulic non-output state, the first brake B1 is put into the engaged state and the second brake B2 is put into the released state to establish the high-speed stage "2nd" of the automatic transmission 18.

Figure 6:
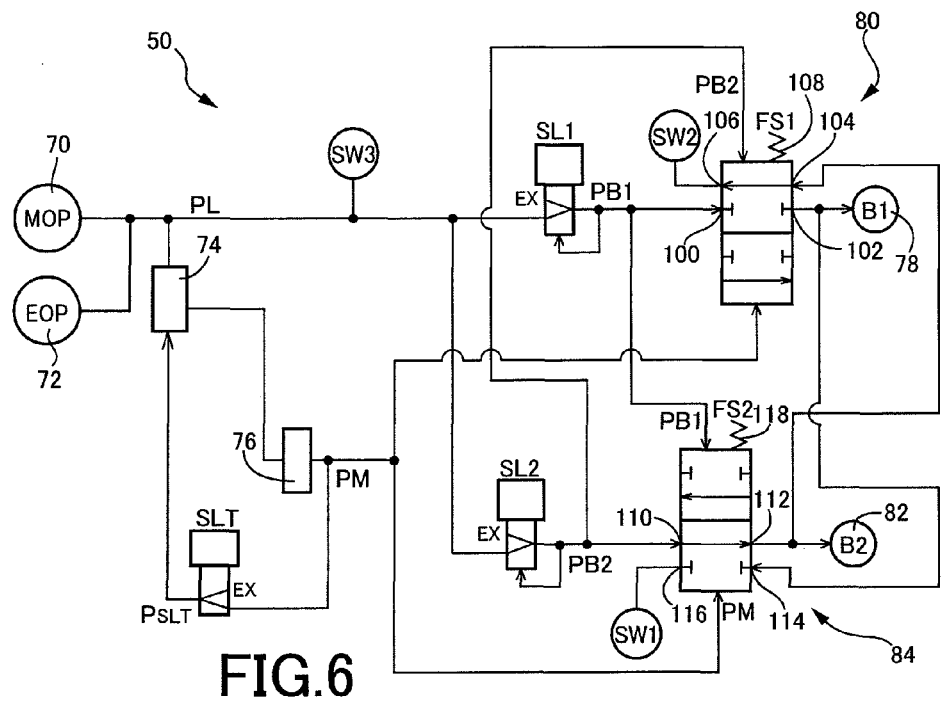
FIG. 6 is another configuration diagram of a general configuration of the hydraulic control circuit.

FIGS. 5 and 6 are configuration diagrams of a general configuration of the hydraulic control circuit 50. The hydraulic control circuit 50 includes a mechanical oil pump 70 driven by the engine 12; an electric oil pump 72 driven by an electric motor; a primary regulator valve 74 (hereinafter, a primary valve 74) of, for example, a relief type that regulates a line oil pressure PL from an original pressure that is an oil pressure generated by activating at least one of the mechanical oil pump 70 and the electric oil pump 72; a modulator valve 76 that regulates a modulator oil pressure PM to a constant value from an original pressure that is an oil pressure discharged from the primary valve 74 for the regulation of the line oil pressure PL by the primary valve 74; and a linear solenoid valve SLT that supplies a signal pressure $P_{SLT}$ to the primary valve 74 for the regulation to the line oil pressure PL corresponding to an engine load, etc., represented by an accelerator opening degree Acc or a throttle valve opening degree $\theta_{TH}$.

A hydraulic actuator 78 of the brake B1 is supplied with an engagement oil pressure PB1 via a first fail-safe valve 80 from a linear solenoid valve SL1 that uses the line oil pressure PL as an original pressure to regulate the engagement oil pressure PB1 supplied to the hydraulic actuator 78. A hydraulic actuator of the brake B2 is supplied with an engagement oil pressure PB2 via a fail-safe valve 84 from a linear solenoid valve SL2 that uses the line oil pressure PL as an original pressure to regulate the engagement oil pressure PB2 supplied to the hydraulic actuator 82.

The linear solenoid valves SL1, SL2, and SLT all have basically the same configuration and are independently excited and unexcited by the electronic control device 60 such that the oil pressures of the hydraulic actuators 78, 82 are independently regulated and controlled and the engagement pressures of the brakes B1 and B2 are controlled. The gear stages are established in the automatic transmission 18 by engaging the predetermined engagement devices in accordance with the engagement operation table of FIG. 4, for example. Since the brake B1 and the brake B2 of the automatic transmission 18 are respectively controlled by the linear solenoid valves SL1, SL2 as described above, the response of the operation of the engagement devices is improved. Alternatively, a hydraulic control circuit for the engagement/release operations of the engagement devices is simplified.

As described above, the first fail-safe valve 80 and the second fail-safe valve 84 preventing the brake B1 and the brake B2 from being engaged at the same time are disposed before the hydraulic actuator 78 of the brake B1, i.e., between the linear solenoid valve SL1 and the hydraulic actuator 78 and before the hydraulic actuator 82 of the brake B2, i.e., between the linear solenoid valve SL2 and the hydraulic actuator 82.

The first fail-safe valve 80 includes an input port 100 supplied with the engagement oil pressure PB1 from the linear solenoid valve SL1, an output port 102 connected to the hydraulic actuator 78 of the brake B1, an input port 104 supplied with the oil pressure PB2 from the solenoid valve SL2 via the second fail-safe valve 84, an output port 106 connected to the hydraulic switch SW2 described later, and a spool not depicted.

The first fail-safe valve 80 is configured to bias the spool in one direction by the actions of the output oil pressure (engagement oil pressure) PB2 of the linear solenoid valve SL2 and an elastic recovery force FS1 of a spring 108 while the modulator oil pressure PM biases the spool in the other direction opposite to the one direction, and the oil passage of the first fail-safe valve 80 is switched depending on a position of the spool. For example, if the engagement oil pressure PB2 is not output, the spool is moved in the other direction by the modulator oil pressure PM against the elastic recovery force FS1 of the spring 108 and the oil passage is switched as depicted in FIG. 5. Therefore, the input port 100 and the output port 102 are brought into communication so that the engagement oil pressure PB1 can be supplied from the linear solenoid valve SL1 to the hydraulic actuator 78 while the communication between the input port 104 and the output port 106 is interrupted to prevent the supply of oil pressure to the hydraulic switch SW2.

If the engagement oil pressure PB2 acts on the first fail-safe valve 80, the spool is moved in the one direction by the biasing force of the engagement oil pressure PB2 and the elastic recovery force FS1 of the spring 108 against the biasing force of the oil pressure PM and the oil passage of the first fail-safe valve 80 is switched as depicted in FIG. 6. Therefore, the communication between the input port 100 and the output port 102 is interrupted to prevent the supply of oil pressure to the hydraulic actuator 78 while the input port 104 and the output port 106 are brought into communication to enable the supply of oil pressure to the hydraulic switch SW2.

The second fail-safe valve 84 includes an input port 110 supplied with the engagement oil pressure PB2 from the linear solenoid valve SL2, an output port 112 connected to the hydraulic actuator 82 of the brake B2, an input port 114 supplied with the oil pressure PB1 from the solenoid valve SL1 via the first fail-safe valve 80, an output port 116 connected to the hydraulic switch SW1 described later, and a spool not depicted.

The second fail-safe valve 84 is configured to bias the spool in one direction by the actions of the output oil pressure (engagement oil pressure) PB1 of the linear solenoid valve SL1 and an elastic recovery force FS2 of a spring 118 while the modulator oil pressure PM biases the spool in the other direction opposite to the one direction, and the oil passage is switched depending on a position of the spool. For example, if the engagement oil pressure PB1 is output, the spool is moved in the one direction by the biasing force of the engagement oil pressure PB1 and the elastic recovery force FS2 of the spring 118 against the biasing force of the oil pressure PM and the oil passage of the second fail-safe valve 84 is switched as depicted in FIG. 5. Therefore, the communication between the input port 110 and the output port 112 is interrupted to prevent the supply of oil pressure to the hydraulic actuator 82 while the input port 114 and the output port 116 are brought into communication to enable the supply of oil pressure to the hydraulic switch SW1.

If the engagement oil pressure PB1 is not output, the spool is moved in the other direction by the oil pressure PM against the elastic recovery force FS2 of the spring 118 and the oil passage of the second fail-safe valve 84 is switched as depicted in FIG. 6. Therefore, the input port 110 and the output port 112 are brought into communication so that the engagement oil pressure PB2 can be supplied from the linear solenoid valve SL2 to the hydraulic actuator 82 while the communication between the input port 114 and the output port 116 is interrupted to prevent the supply of oil pressure to the hydraulic switch SW1.

FIG. 5 depicts the state in which the brake B1 is engaged. Therefore, the engagement oil pressure PB1 is output from the linear solenoid valve SL1 while the engagement oil pressure PB2 is not output from the linear solenoid valve SL2 in the depicted state. Specifically, since the engagement oil pressure PB2 is not output from the linear solenoid valve SL2, the first fail-safe valve 80 is switched as depicted in FIG. 5 and the engagement oil pressure PB1 is supplied to the hydraulic actuator 78. Since the engagement oil pressure PB1 is output from the linear solenoid valve SL1, the second fail-safe valve 84 is switched as depicted in FIG. 5 and the communication between the linear solenoid valve SL2 and the hydraulic actuator 82 is interrupted. Therefore, the hydraulic actuator 82 of the brake B2 is not supplied with an oil pressure during the engagement of the brake B1 and, as a result, the brake B1 and the brake B2 are prevented from being engaged at the same time.

Since the input port 114 and the output port 116 are brought into communication in this case, the hydraulic switch SW1 is supplied with the engagement oil pressure PB1. If the hydraulic switch SW1 is supplied with the oil pressure, a contact of the hydraulic switch SW1 is made conducting by the oil pressure, and a hydraulic signal is output as a result. In other words, as depicted in FIG. 5, when the hydraulic actuator 78 of the brake B1 is supplied with the oil pressure and the supply of the oil pressure to the hydraulic actuator 82 of the brake B2 is interrupted, the hydraulic signal is output from the hydraulic switch SW1. Therefore, the hydraulic switch SW1 functions as a sensor that detects whether the hydraulic control circuit 50 normally operates.

FIG. 6 depicts the state in which the brake B2 is engaged. Therefore, the engagement oil pressure PB2 is output from the linear solenoid valve SL2 while the engagement oil pressure PB1 is not output from the linear solenoid valve SL1 in the depicted state. Specifically, since the engagement oil pressure PB1 is not output from the linear solenoid valve SL1, the second fail-safe valve 84 is switched as depicted in FIG. 6 and the engagement oil pressure PB2 is supplied to the hydraulic actuator 82 of the brake B2. Since the engagement oil pressure PB2 is output from the linear solenoid valve SL2, the first fail-safe valve 80 is switched as depicted in FIG. 6 and the communication between the linear solenoid valve SL1 and the hydraulic actuator 78 of the brake B1 is interrupted. Therefore, the hydraulic actuator 78 of the brake B1 is not supplied with an oil pressure during the engagement of the brake B2 and, as a result, the brake B1 and the brake B2 are prevented from being engaged at the same time.

Since the input port 104 and the output port 106 are brought into communication in the first fail-safe valve 80 in this case, the hydraulic switch SW2 is supplied with the engagement oil pressure PB2. If the hydraulic switch SW2 is supplied with the oil pressure, a contact of the hydraulic switch SW2 is made conducting by the oil pressure, and a hydraulic signal is output as a result. In other words, as depicted in FIG. 6, when the hydraulic actuator 82 of the brake B2 is supplied with the oil pressure and the supply of the oil pressure to the hydraulic actuator 78 of the brake B1 is interrupted, the hydraulic signal is output from the hydraulic switch SW2. Therefore, the hydraulic switch SW2 functions as a sensor that detects whether the hydraulic control circuit 50 normally operates.

Figure 7:
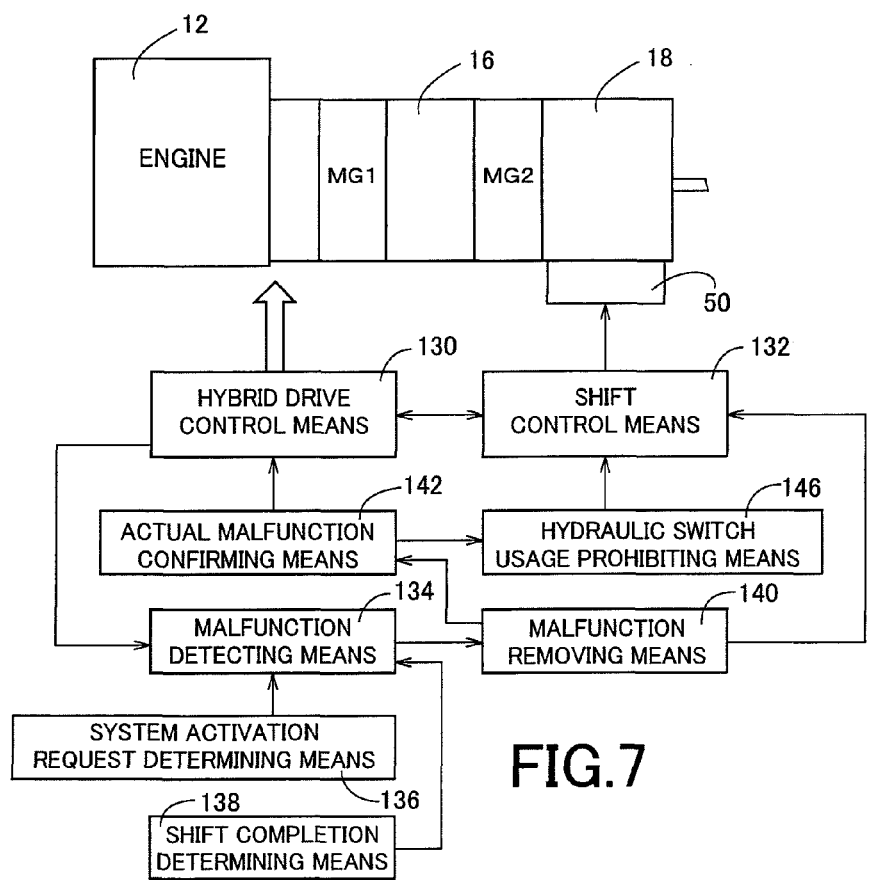
FIG. 7 is a functional block line diagram for explaining a main portion of the control function included in the electronic control device for controlling the power transmission device of FIG. 1.

FIG. 7 is a functional block line diagram for explaining a main portion of the control function included in the electronic control device 60 for controlling the hybrid vehicle 8 (the power transmission device 10).

In FIG. 7, for example, if a key is inserted into a key slot not depicted and the control is then activated by operating ready-on (power-on switch) while the brake pedal 26 is operated, a hybrid drive control means 130 calculates a requested output of a driver based on an accelerator operation amount and drives the engine 12 and/or the second electric motor MG2 to generate the requested output so as to achieve the operation resulting in lower fuel consumption and smaller exhaust gas amount. For example, the hybrid drive control means 130 selectively establishes, for example, a motor traveling mode using only the second electric motor MG2 as a drive power source with the engine 12 stopped, a traveling mode using the second electric motor MG2 as a drive power source for travel while the power of the engine 12 is used for generating electricity, an engine traveling mode mechanically transmitting the power of the engine 12 to the output shaft 14 (the drive wheels 22) for travel, an assist traveling mode driving the second electric motor MG2 to add torque to the output shaft 14 in the engine traveling mode, etc., depending on a traveling state.

When driving the engine 12, the hybrid drive control means 130 controls the engine rotation speed $N_E$ and the engine torque $T_E$ with the first electric motor MG1 such that the engine 12 operates on the optimal fuel consumption curve. When the second electric motor MG2 is driven for torque assist, the automatic transmission 18 is set to the low-speed stage "1st" to increase the torque added to the output shaft 14 while the vehicle speed V is relatively slow, and the automatic transmission 18 is set to the high-speed stage "2nd" to relatively decrease the rotation speed of the second electric motor MG2 for reducing a loss while the vehicle speed relatively increases, thereby performing efficient torque assist. During coasting, the first electric motor MG1 or the second electric motor MG2 is rotationally driven by inertia energy of a vehicle to regenerate electric power, which is stored in the electric storage device 32. Specifically describing the control in the engine traveling mode as an example, the hybrid drive control means 130 drives the engine 12 to operate in an efficient operation range while controlling the drive power distribution between the engine 12 and the second electric motor MG2 and the reaction force due to the electric generation by the first electric motor MG1 to the optimum state for the sake of power performance, fuel consumption improvement, etc.

The hybrid drive control means 130 determines a target drive-power related value, for example, a requested output shaft torque $T_R$ from a drive power map stored in advance based on an accelerator opening degree, a vehicle speed, etc., acting as output request amounts of a driver, calculates a requested output shaft power from the requested output shaft torque $T_R$ in consideration of a charge request value etc., calculates a target engine power $P_E^*$ so as to acquire the requested output shaft power in consideration of a transmission loss, loads of accessories, an assist torque of the second motor generator MG2, the gear stages of the automatic transmission 18, etc., controls the engine 12 and controls an amount of the electric generation of the first motor generator MG1 to achieve a point of operation (operational point) of the engine 12, i.e., the engine rotation speed $N_E$ and the engine torque $T_E$ enabling the acquisition of the target engine power $P_E^*$ while operating the engine 12 along the optimal fuel consumption curve (fuel consumption map, relationship) of the engine empirically obtained and stored in advance so as to satisfy both the drivability and the fuel consumption property in the two-dimensional coordinates using the engine rotation speed $N_E$ and the engine torque $T_E$ as variables.

The hybrid drive control means 130 also performs the control for supplying the electric energy generated by the first electric motor MG1 via the inverters 28, 30 to the electric storage device 32 and the second electric motor MG2. Although a main portion of the power of the engine 12 is mechanically transmitted to the output shaft 14, a portion of the power of the engine 12 is consumed for the electric generation of the first electric motor MG1 and converted into electric energy; the electric energy is supplied via the inverters 28, 30 to the second electric motor MG2; the second electric motor MG2 is driven as an electric motor by the electric energy; and power output from the second electric motor MG2 is transmitted via the automatic transmission 18 to the output shaft 14. The equipments related to the electric energy from the generation to the consumption by the second motor generator MG2 make up an electric path from the conversion of a portion of the power of the engine 20 into electric energy to the conversion of the electric energy into mechanical energy. The hybrid drive control means 130 can directly supply electric energy from the electric storage device 32 via the inverter 30 to the second electric motor MG2 to drive the second electric motor MG2 in addition to the electric energy from the electric path.

The hybrid drive control means 130 can control the first electric motor MG1 with the differential action of the power distribution mechanism 16 to maintain or control the engine rotation speed $N_E$ substantially constant or at an arbitrary rotation speed regardless of whether a vehicle is stopped or traveling. In other words, the hybrid drive control means 130 can control the rotation of the first electric motor MG1 at an arbitrary rotation speed while maintaining or controlling the engine rotation speed $N_E$ substantially constant or at an arbitrary rotation speed.

The hybrid drive control means 130 functionally includes an engine output control means that outputs commands separately or in combination to an engine output control device not depicted to control opening/closing of an electronic throttle valve with a throttle actuator for throttle control, to control a fuel injection amount and an injection timing of a fuel injection device for the fuel injection control, and to control a timing of ignition by an ignition device such as an igniter for the ignition timing control, executing the output control of the engine 12 to generate necessary engine output.

Figure 8:
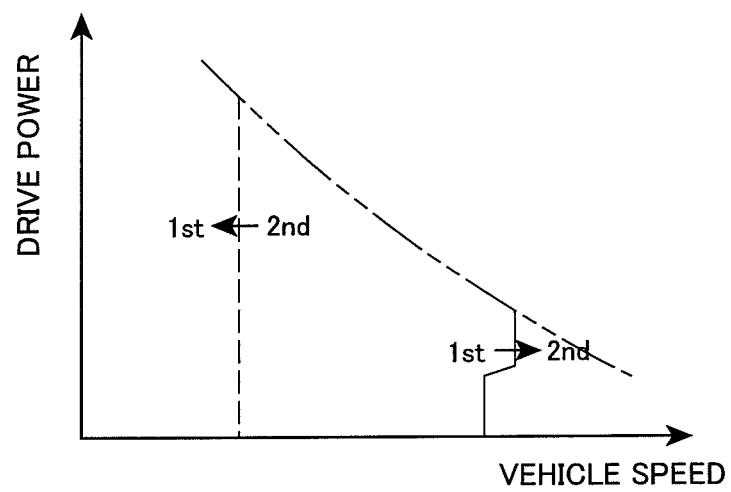
FIG. 8 depicts a shift line diagram for determining a gear stage of the automatic transmission.

A shift control means 132 determines a shift operation in the automatic transmission 18 and executes the determined shift operation. For example, the shift control means 132 determines from a shift line diagram depicted in FIG. 8 whether a gear stage of the automatic transmission 18 is changed based on a vehicle's speed V (output rotation speed $N_{OUT}$) and drive power and determines the gear stage of the automatic transmission 18. Preferably, the shift control means 132 also determines a power-on shift operation. In other words, if an accelerator opening degree detected by the accelerator opening degree sensor AS is equal to or greater than a predetermined value, the shift control means 132 determines whether a gear stage of the automatic transmission 18 is changed and determines the gear stage of the automatic transmission 18.

If the gear stage of the automatic transmission 18 is determined as described above, the shift control means 132 controls the first brake B1 and the second brake B2 for automatic switchover to the determined gear stage. Therefore, if a shift operation from the low-speed stage "1st" to the high-speed stage "2nd" is determined, the hydraulic actuators of the brakes B1, B2 are controlled to engage the first brake B1 and release the second brake B2 via the hydraulic control circuit 50 for shifting. If a shift operation from the high-speed stage "2nd" to the low-speed stage "1st" is determined, the hydraulic actuators of the brakes B1, B2 are controlled to release the first brake B1 and engage the second brake B2 via the hydraulic control circuit 50. For example, so-called clutch-to-clutch shift is performed for both the shift operation from the low-speed stage "1st" to the high-speed stage "2nd" and the shift operation from the high-speed stage "2nd" to the low-speed stage "1st".

Although it is determined whether the hydraulic control circuit 50 is normal based on signals output from the hydraulic switch SW1 and the hydraulic switch SW2 (hereinafter, hydraulic switches SW if not particularly distinguished) in this embodiment, the hydraulic switches SW itself may have failure and it may be determined that the hydraulic control circuit 50 is not in normal operation. Therefore, the malfunction detecting means 134 successively detects malfunctions of the hydraulic switches SW under conditions not affecting travel. The malfunction detecting means 134 is implemented under conditions not affecting travel of a vehicle, for example, at the time of system activation of a vehicle or when a shift of the automatic transmission 18 is completed.

A system activation request determining means 136 determines whether a ready-on switch (power switch) not depicted for activating the system is operated and turned on while the brake pedal 26 (see FIG. 1) is operated after a key is inserted into a key slot not depicted. If the ready-on switch is operated and turned on, the engagement oil pressure is supplied to the brake B2 in preparation for the motor travel using the second electric motor MG2. Therefore, for example, the electric oil pump 72 is driven to generate the line oil pressure PL. Whether the line oil pressure PL is generated is determined based on a hydraulic switch signal output from a hydraulic switch SW3 disposed on the downstream of the regulator valve 74 of the hydraulic control circuit 50. If the generation of the line oil pressure PL is detected, the line oil pressure PL is used as an original pressure to output the engagement oil pressure PB2 from the linear solenoid valve SL2. Therefore, the hydraulic control circuit 50 is put into the state depicted in FIG. 6, and the engagement oil pressure PB2 is supplied to the hydraulic switch SW2 via the first fail-safe valve 80.

The malfunction detecting means 134 determines whether the hydraulic switch SW2 normally operates in the above state. Specifically, while the engagement oil pressure PB2 is supplied to the hydraulic switch SW2, it is determined whether the hydraulic signal is output from the hydraulic switch SW2. If the hydraulic switch SW2 normally operates, the hydraulic signal is output from the hydraulic switch SW2. If the hydraulic switch SW2 has a malfunction, the hydraulic signal is not output even when the engagement oil pressure PB2 is supplied. Based on the above description, it is determined whether the hydraulic switch SW2 normally operates. At the time of system activation, control can also be implemented to determine whether hydraulic switch SW1 normally operates by driving the linear solenoid valve SL1 to output the engagement oil pressure PB1.

A shift completion determining means 138 determines whether a shift of the automatic transmission 18 is performed during traveling and the shift is completed. If the shift is completed, the brake B1 or the brake B2 is in the engaged state and, therefore, it can be determined whether the hydraulic switch SW normally operates in accordance with the engaged state. The malfunction detecting means 134 accordingly determines whether the hydraulic switch SW normally operates. The malfunction detecting means 134 is implemented after waiting for a traveling state to stabilize, rather than being implemented immediately after the completion of the shift.

When an oxide or a foreign material (chemical reactant) in operating oil attaches to a contact of the hydraulic switch SW, i.e., when so-called contact corrosion occurs, the contact of the hydraulic switch SW may not normally turned on even if an oil pressure is normally supplied, i.e., a so-called off-failure may occur. A malfunction as described above occurs on a temporary basis and may return to a normal state when the contact corrosion is removed by a change in oil pressure etc. However, if the malfunction detecting means 134 detects a malfunction of the hydraulic switch SW, the fail-safe is accordingly executed and the drive power or the motor travel may be limited.

Therefore, in this embodiment, if the malfunction detecting means 134 detects a malfunction of the hydraulic switch SW, the malfunction is considered as a temporary malfunction and a malfunction removing means 140 is implemented. The malfunction removing means 140 removes an oxide or foreign material attached to a contact of the hydraulic switch SW to restore the contact of the hydraulic switch SW. The operation of the malfunction removing means 140 will be described with reference to FIGS. 9 and 10.

Figure 9:
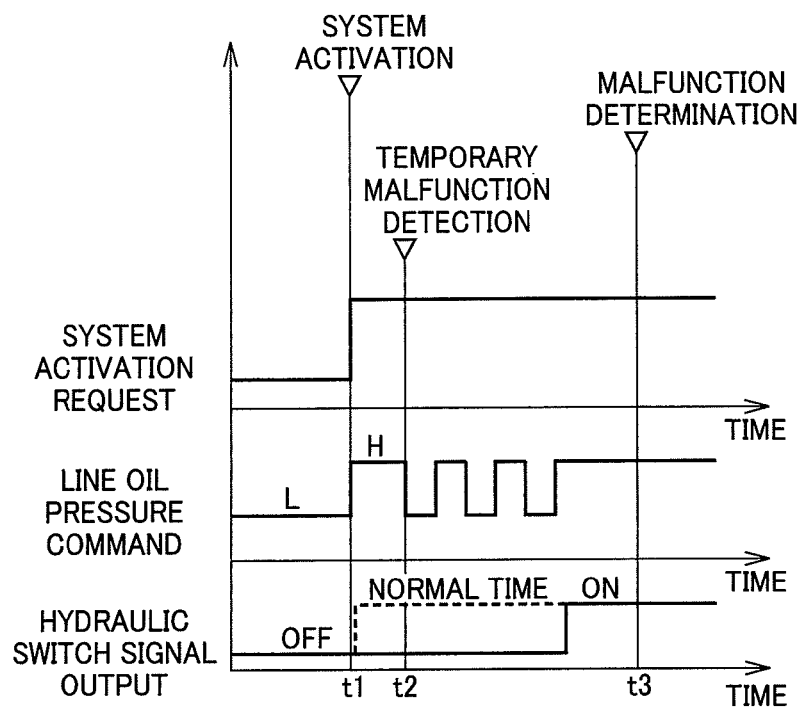
FIG. 9 is a time chart of states of the line oil pressure and the output signal of the hydraulic switch at the time of system activation of a vehicle.

FIG. 9 is a time chart of states of the line oil pressure PL and the output signal of the hydraulic switch SW at the time of system activation of a vehicle. In this time chart, it is assumed that the engagement oil pressure PB2 is supplied to the brake B2 at the time of vehicle system activation. When system activation is requested, i.e., the ready-on switch is operated and turned on at time point t1, the line oil pressure PL is raised to a higher oil pressure H preliminarily set for the vehicle activation. If the hydraulic switch SW2 is normal, the hydraulic switch SW2 outputs a hydraulic signal as indicated by a broken line. In contrast, if contact corrosion occurs on the contact of the hydraulic switch SW2, the contact of the hydraulic switch SW2 is not normally operated and turned on and stays in the off state as indicated by a solid line (off-failure). Therefore, a temporary malfunction of the hydraulic switch SW2 is detected at time point t2.

If the temporary malfunction is detected, the malfunction removing means 140 is implemented. The malfunction removing means 140 periodically switches and changes the line oil pressure PL to the higher oil pressure H and a lower oil pressure L for a preset number of times as depicted in FIG. 9 between time point t2 and time point t3. As the line oil pressure PL is changed as described above, the engagement oil pressure PB2 supplied to the hydraulic switch SW2 is similarly changed to higher and lower pressures and the hydraulic switch SW2 is turned on and off. This causes a disc spring not depicted disposed on the contact of the hydraulic switch SW2 to change in accordance with the change in the oil pressure and, as a result, the foreign material attached to the contact is removed. The change in the line oil pressure PL is controlled by the linear solenoid valve SLT. The higher oil pressure H and the lower oil pressure L are empirically set in advance and set to oil pressures capable of turning on and off the hydraulic switch SW2, specifically, to a degree of oil pressure capable of changing the disc spring disposed on the contact of the hydraulic switch SW2.

When the operation of the malfunction removing means 140 is completed, the malfunction detecting means 134 is implemented again at time point t3. If the hydraulic signal is output from the hydraulic switch SW2, the temporary malfunction set by the malfunction detecting means 134 is canceled and it is determined that the hydraulic switch SW2 normally functions. In contrast, if the malfunction of the hydraulic switch SW2 continues despite the operation of the malfunction removing means 140, an actual malfunction confirming means 142 confirms the malfunction of the hydraulic switch SW2. A hydraulic switch usage prohibiting means 146 prohibits use of the hydraulic switch SW2 confirmed as having an actual malfunction by the actual malfunction confirming means 142. For example, the fail-safe is executed to limit the use of the brake B2 related to the hydraulic switch SW2 based on the failure of the hydraulic switch SW2.

Figure 10:
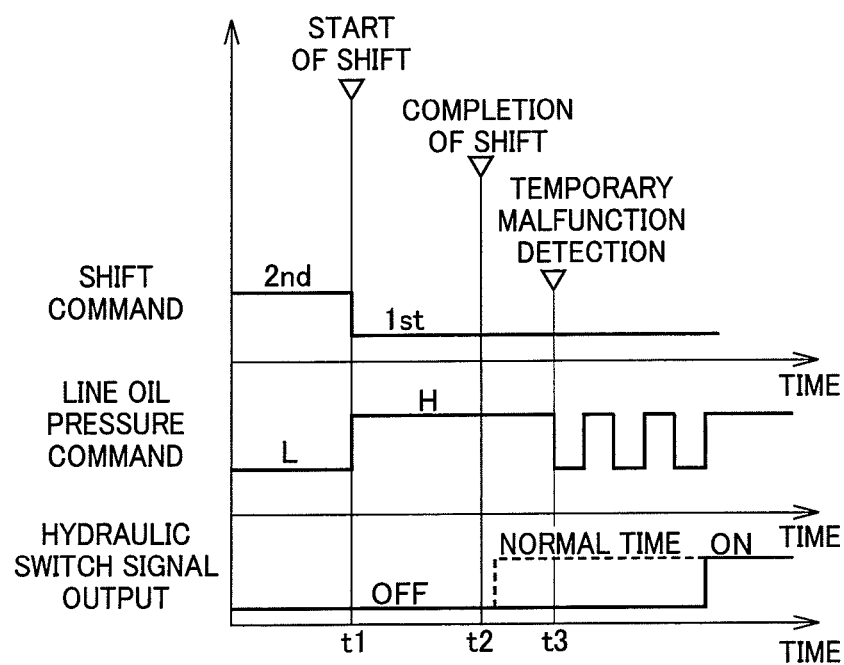
FIG. 10 is a time chart of states of the line oil pressure and the output signal of the hydraulic switch at the time of shift of the automatic transmission.

FIG. 10 is a time chart of states of the line oil pressure PL and the output signal of the hydraulic switch SW at the time of shift of the automatic transmission 18. This time chart depicts the case of the automatic transmission 18 shifting from the high-speed stage "2nd" to the low-speed stage "1st", i.e., the case of switching from the engagement of the brake B1 to the engagement of the brake B2. When the downshift of the automatic transmission 18 is performed from the high-speed stage "2nd" to the low-speed stage "1st" based on the shift line diagram depicted in FIG. 8 at time point t1, the line oil pressure PL is raised from the lower oil pressure L to the higher oil pressure H to stabilize the line oil pressure PL during a shift transition period. The shift of the automatic transmission 18 is completed at time point t2. When the shift is completed, if the hydraulic switch SW2 is normal, the contact of the hydraulic switch SW2 conducts electricity since the line oil pressure PL is raised to the higher oil pressure H, and the hydraulic switch SW2 outputs a hydraulic signal as indicated by a broken line. In contrast, if contact corrosion occurs on the hydraulic switch SW2, the contact of the hydraulic switch SW2 is not normally operated and turned on (does not conduct electricity) and stays in the off state as indicated by a solid line. Therefore, the malfunction detecting means 134 detects a temporary malfunction at time point t3.

If the temporary malfunction is detected, the malfunction removing means 140 is implemented. The malfunction removing means 140 periodically switches and changes the line oil pressure PL to the lower oil pressure L and the higher oil pressure H for a preliminarily empirically set number of times. As the line oil pressure PL is changed to the higher and lower pressures, the engagement oil pressure PB2 acting on the hydraulic switch SW2 is similarly changed to higher and lower pressures. This causes a disc spring not depicted disposed on the contact of the hydraulic switch SW2 to change in accordance with the change in the oil pressure PB2 and, as a result, the foreign material attached to the contact is removed. The change in the line oil pressure PL is controlled by the linear solenoid valve SLT. The higher oil pressure H and the lower oil pressure L are empirically set in advance and set to oil pressures capable of turning on and off the hydraulic switch SW2, specifically, to values capable of changing the disc spring disposed on the contact of the hydraulic switch SW2 and to the extent that the brake B2 of the automatic transmission 18 does not slip even if the line oil pressure PL changes to the lower oil pressure L.

The malfunction removing means 140 can electrically remove a foreign material by increasing an electric current applied to the hydraulic switch SW rather than forcibly operating the hydraulic switch SW as described above. This removal may be performed in combination with the removal by operating the hydraulic switch SW with the line oil pressure PL.

The malfunction detecting means 134 and the malfunction removing means 140 may be implemented at the time of preliminary air conditioning or at the time of remote start before a driver gets into a vehicle, for example. Since the travel of the vehicle is not affected even if the malfunction detecting means 134 and the malfunction removing means 140 are implemented in the states described above, the limitation of the drive power and the limitation of the motor travel are avoided and the means can be implemented in the state not making a driver uncomfortable. In the case of a vehicle requiring a charge of electricity, the means may be configured to be implemented during charging.

Figure 11:
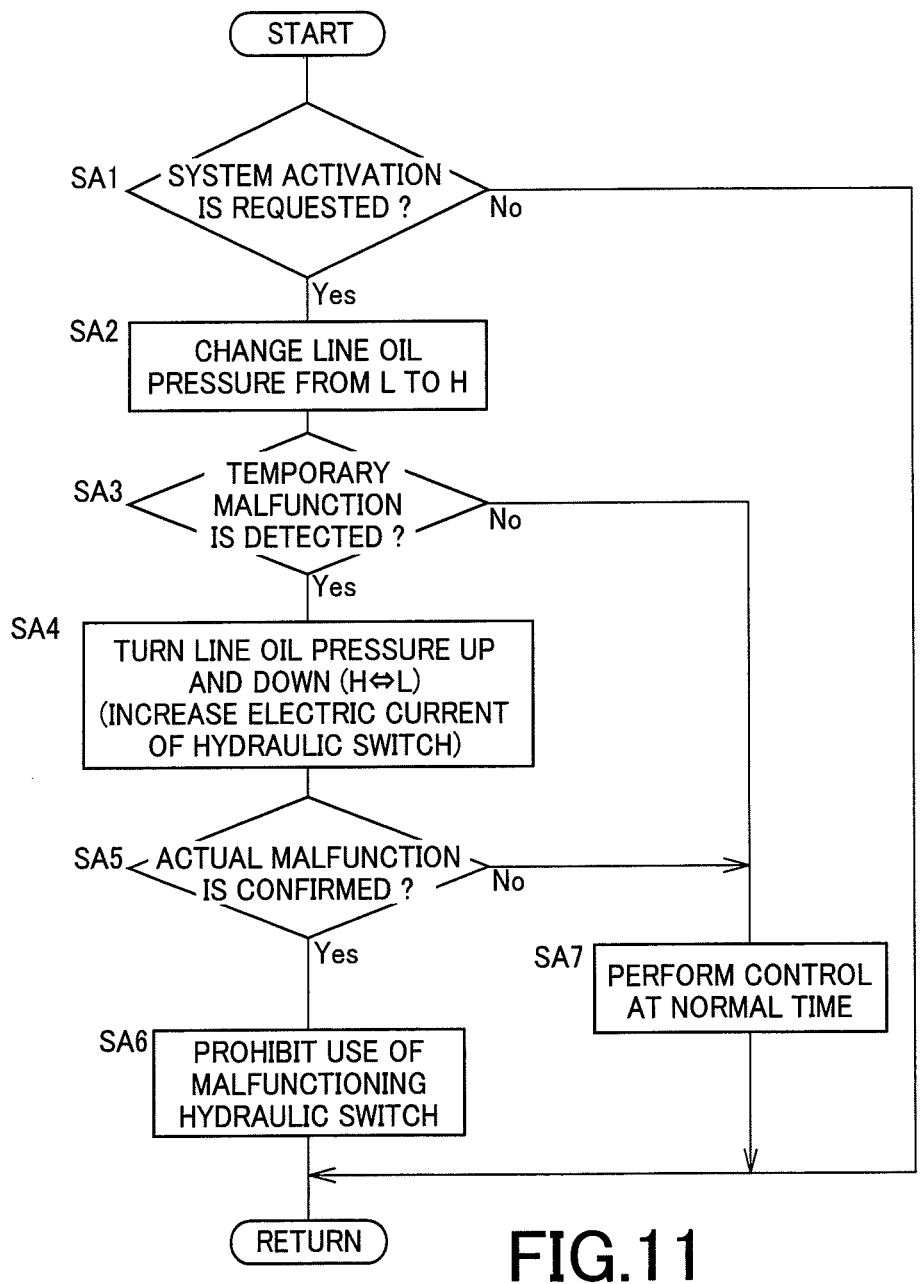
FIG. 11 is a flowchart for explaining a main portion of the control function of the electronic control device, i.e., a control operation of detecting a malfunction of a hydraulic switch at the time of system activation of a vehicle and improving the reliability of the hydraulic switch.

FIG. 11 is a flowchart for explaining a main portion of the control function of the electronic control device 60, i.e., a control operation of detecting a malfunction of a hydraulic switch SW at the time of system activation of a vehicle and improving the reliability of the hydraulic switch SW, which is repeatedly executed in extremely short cycle time on the order of several msec to several tens of msec, for example.

At step SA1 corresponding to the system activation request determining means 136, it is determined whether a system activation request for a vehicle is made and, specifically, it is determined whether the ready-on switch (power-on switch) for activating the system is operated and turned on. If SA1 is determined to be negative, this routine is terminated. If SA1 is determined to be positive, at SA2 corresponding to the hybrid drive control means 130, the line oil pressure PL is raised to the higher oil pressure H in association with the system activation of the vehicle. At SA3 corresponding to the malfunction detecting means 134, it is determined whether a temporary malfunction of the hydraulic switch SW is detected. If the hydraulic switch SW is normal, SA3 is determined to be negative and the control at the normal time is performed at SA7. On the other hand, if a malfunction of the hydraulic switch SW is detected, SA3 is determined to be positive and the line oil pressure PL is repeatedly switched to the higher oil pressure H and the lower oil pressure L at SA4 corresponding to the malfunction removing means 140 to operate the hydraulic switch SW and remove a foreign material attached to the contact. The electric current applied to the hydraulic switch SW can be increased as an alternative means of removing a foreign material to electrically remove the foreign material and these means may be implemented together. At SA5 corresponding to the actual malfunction confirming means 142, the malfunction of the hydraulic switch SW is confirmed. For example, if the temporary malfunction detected at SA3 is canceled at SA5, SA5 is determined to be negative and the control at the normal time is performed at SA7. On the other hand, if the malfunction of the hydraulic switch SW continues despite performing the operation of SA4, SA5 is determined to be positive and the malfunction of the hydraulic switch SW is confirmed. At SA6 corresponding to the hydraulic switch usage prohibiting means 146, the use of the hydraulic switch SW confirmed as malfunctioning is prohibited and the fail-safe is executed such as limiting the use of the engagement device etc., related to the hydraulic switch SW confirmed as malfunctioning, for example.

Figure 12:
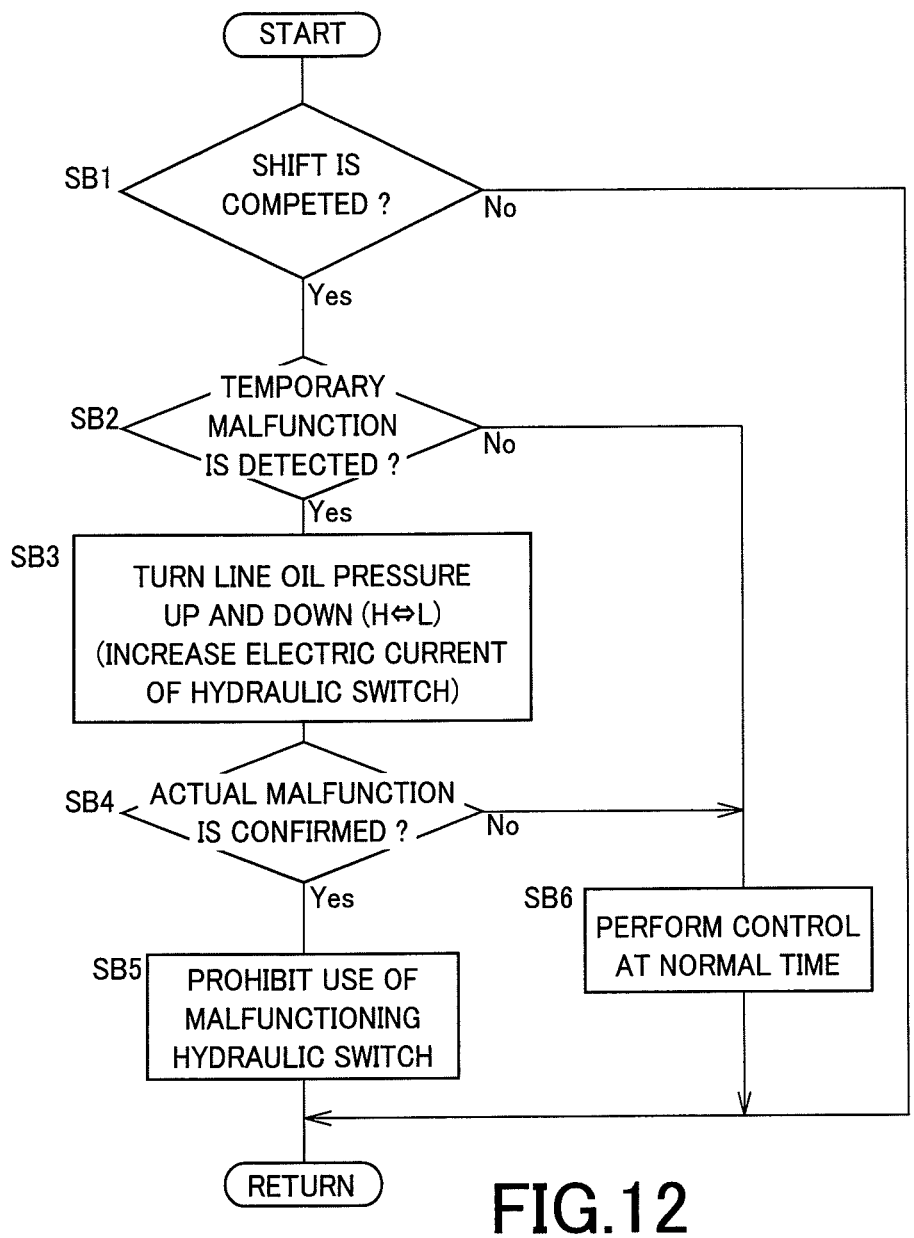
FIG. 12 is a flowchart for explaining a main portion of the control function of the electronic control device, i.e., a control operation of detecting a malfunction of a hydraulic switch at the time of completion of the shift of the automatic transmission 18 and improving the reliability of the hydraulic switch.

FIG. 12 is a flowchart for explaining a main portion of the control function of the electronic control device 60, i.e., a control operation of detecting a malfunction of a hydraulic switch SW at the time of completion of the shift of the automatic transmission 18 and improving the reliability of the hydraulic switch SW, which is repeatedly executed in extremely short cycle time on the order of several msec to several tens of msec, for example.

At SB1 corresponding to the shift completion determining means 138, it is determined whether a shift of the automatic transmission 18 is completed. If SB 1 is determined to be negative, this routine is terminated. If SB1 is determined to be positive, at SB2 corresponding to the malfunction detecting means 134, it is determined whether a temporary malfunction of the hydraulic switch SW is detected. If the hydraulic switch SW is normal, SA3 is determined to be negative and the control at the normal time is performed at SB6. On the other hand, if a malfunction of the hydraulic switch SW is detected, SB2 is determined to be positive and the line oil pressure PL is repeatedly switched to the higher oil pressure H and the lower oil pressure L at SB3 corresponding to the malfunction removing means 140 to operate the hydraulic switch SW and remove a foreign material attached to the contact. The electric current applied to the hydraulic switch SW can be increased as an alternative means of removing a foreign material to electrically remove the foreign material and these means may be implemented together. At SB4 corresponding to the actual malfunction confirming means 142, the malfunction of the hydraulic switch SW is determined. Specifically, if the temporary malfunction detected at SB2 is canceled at SB4, SB4 is determined to be negative and the control at the normal time is performed at SB6. On the other hand, if the malfunction of the hydraulic switch SW continues despite performing the operation of SB3, SB4 is determined to be positive and the malfunction of the hydraulic switch SW is confirmed. At SB5 corresponding to the hydraulic switch usage prohibiting means 146, the use of the hydraulic switch SW confirmed as malfunctioning is prohibited. For example, if the malfunction of the hydraulic switch SW2 is confirmed, the fail-safe is performed such as limiting the use of the engagement device etc., related to the hydraulic switch SW2.

Figure 13:
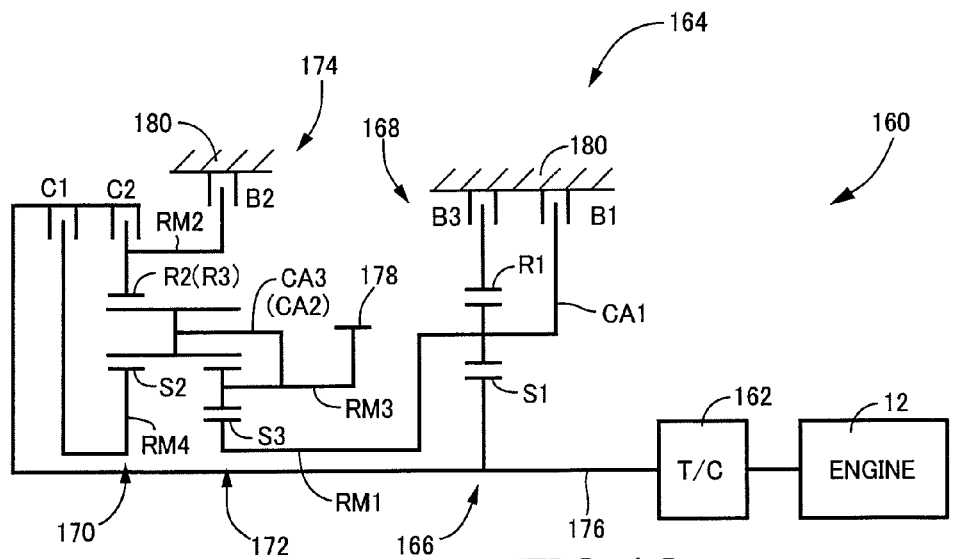
FIG. 13 is a schematic of a power transmission device that is another embodiment of the present invention.

FIG. 13 is a schematic of a power transmission device 160 that is another embodiment of the present invention. The power transmission device 160 is a transverse-mounted power transmission device of an FF (front-engine front-drive) vehicle and is made up of an internal combustion engine such as a gasoline engine or a diesel engine. The output of the engine 12 is transmitted through a torque converter 162 and an automatic transmission 164 to drive wheels (front wheels) from differential gear device not depicted. The engine 12 is a power source (motor) for travel of a vehicle and the torque converter 162 is a fluid coupling.

The automatic transmission 164 coaxially has a first shifting portion 168 made up mainly of a single pinion type first planetary gear device 166, and a second shifting portion 174 made up mainly of a single pinion type second planetary gear device 170 and a double pinion type third planetary gear device 172, and changes speed of rotation of an input shaft 176 to output the rotation from an output gear 178. The input shaft 176 corresponds to an input member and is a turbine shaft of the torque converter 162 in this embodiment, and the output gear 178 corresponds to an output member and rotationally drives left and right drive wheels via a differential gear device. The automatic transmission 164 is configured substantially symmetrically relative to the center line and the lower half from the center line is not depicted in FIG. 13.

The first planetary gear device 166 making up the first shifting portion 168 includes three rotating elements, which are a sun gear S1, a carrier CA1, and a ring gear R1 and, when the sun gear S1 is coupled to the input shaft 176 and rotationally driven and the ring gear R1 is unrotatably fixed to a case 180 via a third brake B3, the carrier CA1 is rotated and outputs the rotation as an intermediate output member at a reduced rotation speed relative to the input shaft 176. The second planetary gear device 170 and the third planetary gear device 172 making up the second shifting portion 174 are partially coupled to each other to form four rotating elements RM1 to RM4; specifically, a sun gear S3 of the third planetary gear device 172 forms a first rotating element RM1; a ring gear R2 of the second planetary gear device 170 and a ring gear R3 of the third planetary gear device 172 are coupled to each other to form a second rotating element RM2; a carrier CA2 of the second planetary gear device 170 and a carrier CA3 of the third planetary gear device 172 are coupled to each other to form a third rotating element RM3; and a sun gear S2 of the second planetary gear device 170 forms a fourth rotating element RM4. The second planetary gear device 170 and the third planetary gear device 172 are formed as a Ravigneaux type planetary gear train with the carriers CA2 and CA3 made up of a common member, the ring gears R2 and R3 made up of a common member, and a pinion gear of the second planetary gear device 170 used also as a second pinion gear of the third planetary gear device 172.

The first rotating element RM1 (the sun gear S3) is selectively coupled to the case 180 by the first brake B1 to stop rotation; the second rotating element RM2 (the ring gears R2, R3) is selectively coupled to the case 180 by the second brake B2 to stop rotation; the fourth rotating element RM4 (the sun gear S2) is selectively coupled to the input shaft 176 via a first clutch C1; the second rotating element RM2 (the ring gears R2, R3) is selectively coupled to the input shaft 176 via a second clutch C2; the first rotating element RM1 (the sun gear S3) is integrally coupled to the carrier CA1 of the first planetary gear device 166, i.e., the intermediate output member; and the third rotating element RM3 (the carriers CA2, CA3) is integrally coupled to the output gear 178 to output the rotation.

The clutches C1, C2 and the brakes B1, B2, B3 (hereinafter, simply, clutches C and brakes B if not particularly distinguished) are hydraulic friction engagement devices under the engagement control of hydraulic actuators, such as multiplate type clutches and brakes, and the clutches C and the brakes B are subjected to the engagement/release control of a hydraulic control circuit 222 depicted in FIG. 14 and appropriately engaged depending on a shift operation position $P_{SH}$ of a shift operation device 202 (see FIG. 15) to establish gear stages of forward six speeds and backward one speed.

Figure 14:
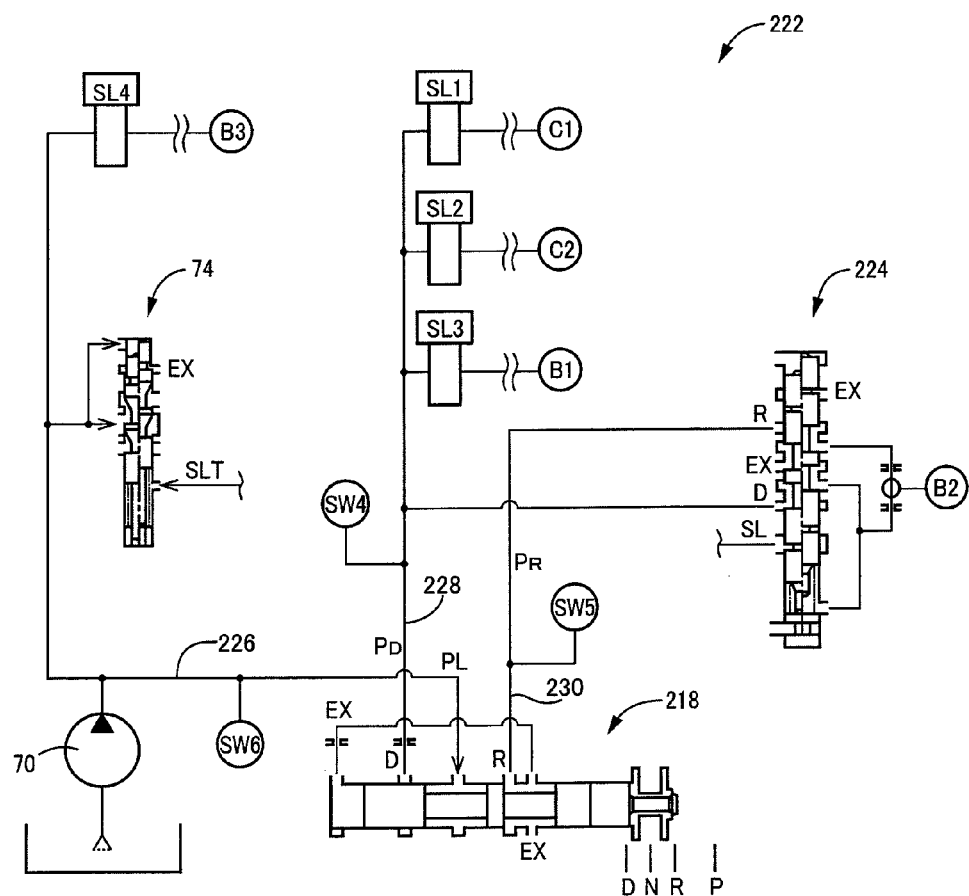
FIG. 14 is a diagram of the hydraulic control circuit of the power transmission device of FIG. 13.

FIG. 14 is a diagram of the hydraulic control circuit 222 of the power transmission device 160. As depicted in FIG. 14, the hydraulic control circuit 222 includes the mechanical oil pump 70 rotationally driven by the engine 12, the primary regulator valve 74, a shift switching valve 218, the linear solenoid valves SL1 to SL4, and a B2 control valve 224, and the operating oil pumped up by the mechanical oil pump 70 is regulated to a predetermined line oil pressure PL depending on an accelerator operation amount (output request amount of a driver) etc., by the primary regulator valve 74 supplied with a signal pressure from the linear solenoid valve SLT not depicted. The third brake B3 is subjected to the engagement/release control with the engagement oil pressure controlled by the linear solenoid valve SL4 supplied directly with the line oil pressure PL.

Figure 15:
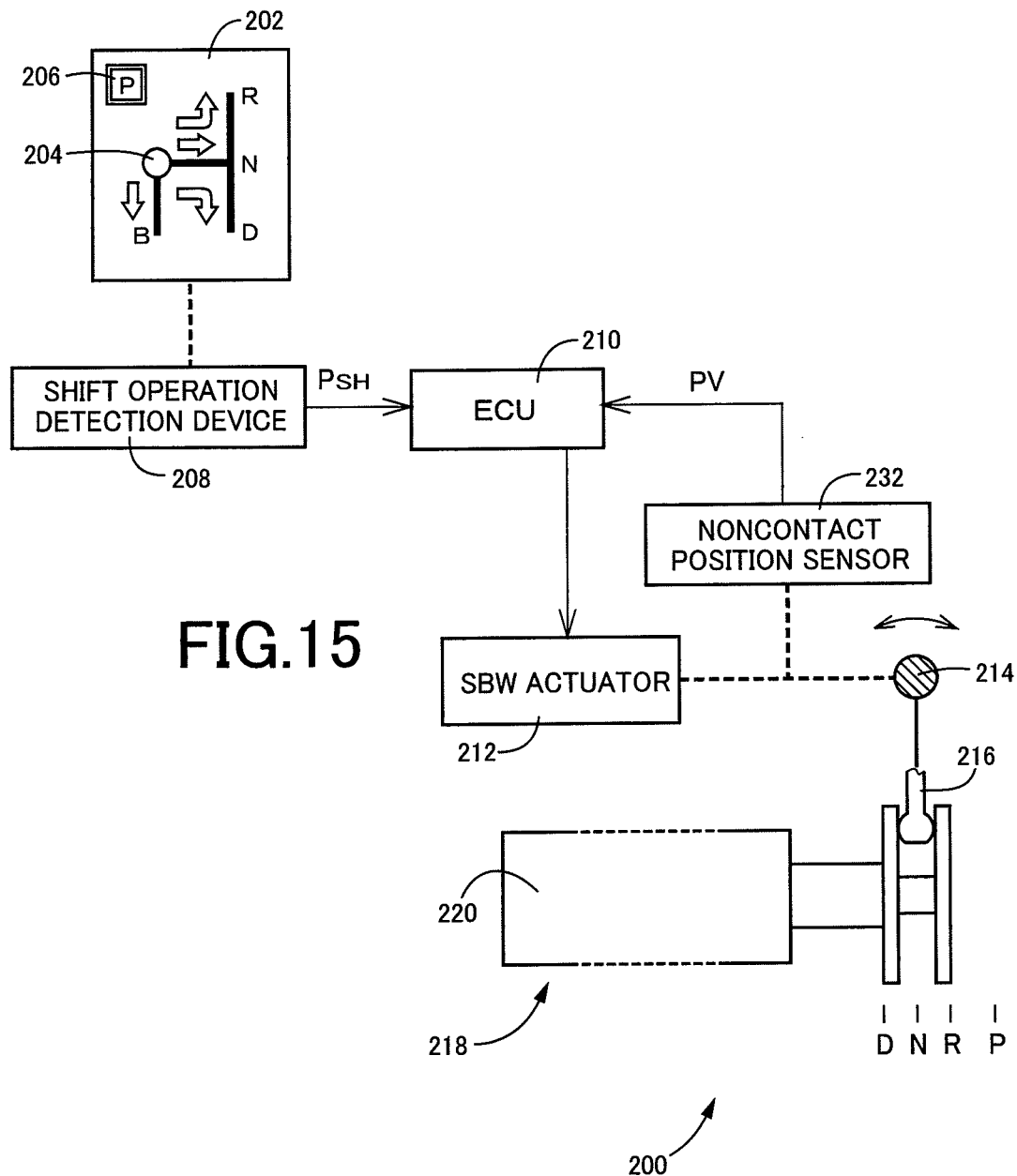
FIG. 15 is a block line diagram for explaining a control system of the power transmission device of FIG. 13 for electrically switching a shift position of the shift switching valve depending on operation of a shift lever by a driver.

FIG. 15 is a block line diagram for explaining a control system of the power transmission device 160 for electrically switching a shift position of the shift switching valve 218 depending on operation of a shift lever by a driver. The shift switching valve 218 switches an oil passage depending on operation of the shift operation device 202 to supply a forward oil pressure $P_D$ to the linear solenoid valves SL1 to SL3, which are disposed correspondingly to the clutches C1, C2, and the first brake B1, and the B2 control valve 224, to supply a backward oil pressure $P_R$ to the B2 control valve 224, and to stop the oil pressure supply to the valves. The shift operation device 202 is operated depending on intention to shift of a driver and includes a shift lever 204 moved and operated to four positions, i.e., "R (reverse)" for backward travel, "N (neutral)" interrupting the power transmission, "D (drive)" for forward travel, and "B (brake)" for engine brake, and a push-button P-switch 206 pushed and operated at the time of parking, as depicted in FIG. 15. The shift lever 204 is of a momentary type and always automatically returned to a neutral position depicted in FIG. 15, and includes a shift operation detection device 208 detecting that the shift lever 204 is operated to the operation positions "R", "N", "D", and "B", to electrically detect the shift operation positions $P_{SH}$ including the ON operation of the P-switch 206 (an operation position "P"), i.e., the intention to shift of a driver. An electronic control unit (ECU) 210 controls a SBW (shift-by-wire) actuator 212 depending on the shift operation positions $P_{SH}$ to rotate a switching shaft 214 around a shaft center and, as a result, a spool (valve body) 220 of the shift switching valve 218 is mechanically moved via a lever 216 in a straight line direction and positioned at four shift positions "P", "R", "N", and "D" to switch the oil passage. The shift operation position $P_{SH}$ of "B" is based on the premise of the forward travel at "D" and the engine brake is enhanced by electrically executing the shift control while a manual valve 46 is maintained at the shift position "D".

The shift position "D" of the shift switching valve 218 is a forward drive position for forward travel and, as is clear from FIG. 14, the shift switching valve 218 brings a supply oil passage 226 supplied with the line oil pressure PL into communication with a forward oil passage 228 and outputs the forward oil pressure $P_D$ equal to the line oil pressure PL into the forward oil passage 228. The forward oil passage 228 is connected to the linear solenoid valves SL1 to SL3 and the B2 control valve 224 and the forward oil pressure $P_D$ is regulated and controlled by these valves to perform the engagement/release control of each of the clutches C1, C2, and the brakes B1, B2, thereby establishing any one forward gear stage of the first speed gear stage "1st" to the sixth speed gear stage "6th" in combination with the engagement/release control of the third brake B3. The B2 control valve 224 is supplied with signal oil pressures from solenoid valves SLU and SL not depicted, and the engagement oil pressure of the second brake B2 is controlled based on the signal oil pressure of the solenoid valve SLU.

The shift position "R" of the shift switching valve 218 is a backward drive position for backward travel and the shift switching valve 218 brings the supply oil passage 226 supplied with the line oil pressure PL into communication with a backward oil passage 230 and outputs the backward oil pressure $P_R$ equal to the line oil pressure PL into the backward oil passage 230. Since the backward oil passage 230 is connected to the B2 control valve 224, the backward oil pressure $P_R$ is supplied to the second brake B2 through the B2 control valve 224 to engage the second brake B2, and the third brake B3 is engaged to establish the backward gear stage "Rev".

The shift position "P" of the shift switching valve 218 is a parking position for interrupting the power transmission from the drive power source and mechanically preventing the rotation of the drive wheels with a parking lock device not depicted, and the shift switching valve 218 interrupts the communications between the supply oil passage 226 supplied with the line oil pressure PL and both the forward oil passage 228 and the backward oil passage 230 and brings the forward oil passage 228 and the backward oil passage 230 into communication with an EX port to drain the operating oil. The shift position "N" is an interruption position that interrupts the power transmission from the drive power source and the shift switching valve 218 interrupts the communications between the supply oil passage 226 supplied with the line oil pressure PL and both the forward oil passage 228 and the backward oil passage 230 and brings the backward oil passage 230 into communication with the EX port to drain the operating oil. The shift switching valve 218 of FIG. 14 depicts the state of the shift position "N".

This embodiment includes the shift switching valve 218 and the switching shaft 214 to make up a shift mechanism 200 that mechanically switches a vehicle drive state, i.e., switches to one of a plurality of shift positions, and the SBW actuator 212 corresponds to a shift driving means electrically controlled based on intention of a driver. The SBW actuator 212 is made up of an SR motor (switched reluctance motor) in this embodiment and is coupled to the switching shaft 214 via reduction gears etc., and rotationally driven.

The switching shaft 214 is disposed with a noncontact position sensor 232. The noncontact position sensor 232 is a noncontact rotation angle sensor that detects absolute position information of mechanical displacement of the shift mechanism 200, which is rotational displacement (mechanical displacement) of the switching shaft 214 in this case. The noncontact position sensor 232 can detect a rotation angle of the switching shaft 214 based on a degree of a position voltage PV changed in accordance with a rotation angle of the switching shaft 214 and, in other words, can detect the shift positions "P", "R", "N", and "D" of the shift switching valve 218.

As described above, the shift position of the switching shaft 214 is electrically switched by the SBW actuator 212. Since shift switching may falsely be operated due to electric failure in the shift mechanism 200 configured as described above, the forward oil passage 228 and the backward oil passage 230 depicted in FIG. 14 are disposed with hydraulic switches SW4 and SW5, respectively. For example, if the shift position is switched to "P", it is determined whether a hydraulic signal is output from the hydraulic switch SW4 and, if no hydraulic signal is output even when the forward oil pressure $P_D$ is supplied, a malfunction of the shift mechanism 200 is determined. For example, if the shift position is switched to "R", it is determined whether a hydraulic signal is output from the hydraulic switch SW5 and, if no hydraulic signal is output even when the backward oil pressure $P_R$ is supplied, a malfunction of the shift mechanism 200 is determined.

Even in the power transmission device 160 configured as described above, the reliability of the hydraulic switches SW (the hydraulic switch SW4 and the hydraulic switch SW5) can be improved by including the malfunction detecting means 134, the malfunction removing means 140, etc., for the hydraulic switch SW4 and the hydraulic switch SW5.

For example, at the time of system activation of a vehicle, the line oil pressure PL is supplied to the forward oil passage 228 and the backward oil passage 230 to detect a malfunction of the hydraulic switches SW (SW4, SW5). This is based on the premise that a hydraulic switch SW6 disposed on the supply oil passage 226 is in normal operation, i.e., a signal oil pressure is output from the hydraulic switch SW6 based on the supply of the line oil pressure PL. If a malfunction is detected in the hydraulic switch SW4 or the hydraulic switch SW5, the malfunction removing means 140 can be implemented to remove a foreign material (contact corrosion) attached to the hydraulic switch SW (SW4, SW5). Specifically, the malfunction removing means 140 switches a shift position with the SBW actuator 212 more than once. For example, the malfunction removing means 140 repeatedly performs the switching from the shift position "D" to the shift position "N" for a predetermined number of times in the hydraulic switch SW4 to remove a foreign material attached to the contact of the hydraulic switch SW4. The malfunction removing means 140 repeatedly performs the switching from the shift position "R" to the shift position "N" for a predetermined number of times in the hydraulic switch SW5 to remove a foreign material attached to the contact of the hydraulic switch SW5. A means of increasing an electric current applied to the hydraulic switches SW to electrically remove a foreign material may be implemented instead of the above means or may be implemented together with the above means. If the malfunction of the hydraulic switch SW continues even when the malfunction removing means 140 is implemented, the actual malfunction confirming means 142 confirms the malfunction of the hydraulic switch SW. As is the case with the embodiment described above, the same control may be implemented after completion of shift of the automatic transmission 164, for example.

As described above, according to the embodiment, for example, if a malfunction having a possibility of restoration occurs such as contact corrosion of the hydraulic switch SW, a malfunction of the hydraulic switch SW is detected; however, the malfunction removing means 140 can be implemented in this case to remove the contact corrosion. Therefore, the reliability of the hydraulic switch SW in the malfunction detection can be improved by performing the malfunction detection again while the contact corrosion is removed.

According to the embodiment, the malfunction removing means 140 intermittently changes the oil pressure applied to the hydraulic switch SW to repeat the ON/OFF operations of the contact of the hydraulic switch SW. As a result, an oxide or a foreign material attached to the contact of the hydraulic switch SW can be removed.

According to the embodiment, the malfunction removing means 140 is implemented at the time of system activation of a vehicle. As a result, a malfunction of the hydraulic switch SW can be detected in the state not affecting the travel of the vehicle.

According to the embodiment, the malfunction removing means 140 is implemented after completion of shift of the automatic transmissions 18, 164. As a result, since the traveling state is not affected by, for example, changing the oil pressure after completion of the shift, a malfunction of the hydraulic switch SW can be detected in the state not affecting the travel of the vehicle.

The embodiment includes the actual malfunction confirming means 142 confirming that the hydraulic switch SW has an actual malfunction if a malfunction of the hydraulic switch SW continues even when the malfunction removing means 140 is activated, and the hydraulic switch usage prohibiting means 146 that prohibits use of the hydraulic switch SW confirmed as having an actual malfunction by the actual malfunction confirming means 142. As a result, travelling abnormality associated with a malfunction of the hydraulic switch SW can be avoided.

Although the embodiment of the present invention has been described in detail with reference to the drawings, this is merely one embodiment and the present invention is applicable in other forms.

For example, in the embodiments, the mounting attitude of the vehicle power transmission device relative to the vehicle may be transverse as in an FF (front-engine front-drive) vehicle with an axis of a drive device extending in the width direction of the vehicle or longitudinal as in an FR (front-engine rear-drive) vehicle with an axis of a drive device extending in the longitudinal direction of the vehicle. The present invention is also applicable to a four-wheel-drive power transmission device.

Although the present invention is applied to a hybrid vehicle and a shift-by-wire (SBW) type vehicle in the embodiments, the present invention is not particularly limited to the vehicles and is applicable to a conventional automatic transmission with an oil passage of a hydraulic control circuit switched by manual switching, a CVT stepless transmission, etc. In short, the present invention is applicable to any power transmission device including a hydraulic control circuit and a hydraulic switch.

Although it is desirable in terms of response performance that the hydraulic control circuit supplies, for example, an output oil pressure of a linear solenoid valve to each of the hydraulic actuators (hydraulic cylinders) of the clutches C and the brakes B in the embodiments, the output oil pressure of the linear solenoid valve can be used as a pilot oil pressure to control shift control valves such that the operating oil is supplied from the control valves to the hydraulic actuators.

Although the linear solenoid valves are disposed in one-to-one correspondence to, for example, each of a plurality of hydraulic friction engagement devices in the embodiments, if a plurality of hydraulic friction engagement devices exists that is not engaged or subjected to the engagement/release control at the same time, a linear solenoid valve common to these devices can be disposed, and various other forms are available. The hydraulic control may not necessarily be performed by the linear solenoid valves for all the hydraulic friction engagement devices, and the hydraulic control may partially or entirely be performed by a regulating means other than the linear solenoid valves such as duty control of an ON-OFF solenoid valve.

Although the malfunction detection and the malfunction removal of the hydraulic switch SW2 are performed at the time of system activation of a vehicle in the embodiments, the malfunction detection and the malfunction removal of the hydraulic switch SW1 may further be performed by outputting the engagement oil pressure PB1 from the linear solenoid valve SL1. The above control may be performed for the hydraulic switch SW3 and the hydraulic switch SW6.

Although the malfunction detection and the malfunction removal of the hydraulic switch SW2 are performed for downshift from the high-speed stage "2nd" to the low-speed stage "1st" in the embodiments, the control may be performed at the time of upshift from the low-speed stage "1st" to the high-speed stage "2nd". In this case, the malfunction detection and the malfunction removal of the hydraulic switch SW1 are performed.

The above description is merely one embodiment of the present invention and the present invention can be implemented in variously modified or altered forms within a range not departing from the spirit thereof.

The invention claimed is:

1. A control device for a vehicle hydraulic control circuit having a hydraulic switch disposed on a hydraulic control circuit of an automatic transmission, comprising:
 a malfunction detecting portion configured to detect a malfunction of the hydraulic switch;
 a malfunction removing portion configured to execute an operation for restoring a contact of the hydraulic switch when the malfunction of the hydraulic switch is detected;
 an actual malfunction confirming portion configured to confirm that the hydraulic switch as an actual malfunction if the malfunction of the hydraulic switch continues despite the operation of the malfunction removing portion;
 the malfunction removing portion configured to intermittently change an oil pressure applied to the hydraulic switch to repeat ON/OFF operations of the contact of the hydraulic switch; and
 the hydraulic switch configured to output a hydraulic signal by making the contact of the hydraulic switch conducting.

2. The control device for a vehicle hydraulic control circuit of claim 1, wherein the malfunction removing portion increases an electric current applied to the hydraulic switch.

3. The control device for a vehicle hydraulic control circuit of claim 2, the malfunction removing portion is implemented at the time of system activation of a vehicle.

4. The control device for a vehicle hydraulic control circuit of claim 2, the malfunction removing portion is implemented after completion of shift of the automatic transmission.

5. The control device for a vehicle hydraulic control circuit of claim 2, including
 a hydraulic switch usage prohibiting portion configured to prohibit use of the hydraulic switch confirmed as having an actual malfunction by the actual malfunction confirming portion.

6. The control device for a vehicle hydraulic control circuit of claim 1, the malfunction removing portion is implemented at the time of system activation of a vehicle.

7. The control device for a vehicle hydraulic control circuit of claim 6, including a hydraulic switch usage prohibiting portion configured to prohibit use of the hydraulic switch confirmed as having an actual malfunction by the actual malfunction confirming portion.

8. The control device for a vehicle hydraulic control circuit of claim 1, the malfunction removing portion is implemented after completion of shift of the automatic transmission.

9. The control device for a vehicle hydraulic control circuit of claim 8, including a hydraulic switch usage prohibiting portion configured to prohibit use of the hydraulic switch confirmed as having an actual malfunction by the actual malfunction confirming portion.

10. The control device for a vehicle hydraulic control circuit of claim 1, including a hydraulic switch usage prohibiting portion configured to prohibit use of the hydraulic switch confirmed as having an actual malfunction by the actual malfunction confirming portion.

* * * * *